United States Patent [19]

Yamaguchi

[11] Patent Number: 5,035,275
[45] Date of Patent: Jul. 30, 1991

[54] METHOD OF CONTROLLING THE PYROLYSIS RATE OF A PLASTIC FOAM

[75] Inventor: Takeshi Yamaguchi, Tokyo, Japan

[73] Assignee: Arco Chemical Technology, Inc., Wilmington, Del.

[21] Appl. No.: 426,823

[22] Filed: Oct. 25, 1989

Related U.S. Application Data

[63] Continuation-in-part of Ser. No. 233,081, Aug. 17, 1988, abandoned.

[30] Foreign Application Priority Data

Feb. 26, 1988 [JP] Japan .................. 63-42212

[51] Int. Cl.$^5$ .............................................. B22C 9/04
[52] U.S. Cl. ........................................ 164/34; 164/45; 521/57; 521/918; 521/919
[58] Field of Search ..... 521/57, DIG. 918, DIG. 919; 164/34, 45

[56] References Cited

U.S. PATENT DOCUMENTS

| | | | |
|---|---|---|---|
| 2,861,898 | 11/1958 | Platzer | 521/57 |
| 3,304,274 | 2/1967 | Eng | 521/57 |
| 3,351,123 | 11/1967 | Payne et al. | 164/34 |
| 3,444,104 | 5/1969 | Immel et al. | 521/57 |
| 3,560,414 | 2/1971 | Miskel, Jr. | 521/57 |
| 4,029,613 | 6/1977 | Quinlan et al. | 521/57 |
| 4,198,485 | 4/1980 | Stark, Jr. | 521/57 |
| 4,547,840 | 12/1970 | Stastny et al. | 260/2.5 |
| 4,790,367 | 12/1988 | Moll et al. | 164/34 |
| 4,874,030 | 10/1989 | Kuphal et al. | 164/34 |
| 4,877,078 | 10/1989 | Wittmoser | 164/34 |
| 4,966,220 | 10/1990 | Hesterberg et al. | 164/34 |

FOREIGN PATENT DOCUMENTS 1031138  5/1966  United Kingdom .

OTHER PUBLICATIONS

DE 2,334,854, Chem. Abstracts 82, 172188b.

*Primary Examiner*—Morton Foelak
*Attorney, Agent, or Firm*—Lewis J. Young

[57] ABSTRACT

The thermal shrinkage and pyrolysis rate of plastic foam moldings are successfully controlled by coating the expandable plastic beads used in the preparation of the moldings with varying amounts of substantially water-insoluble inorganic siliceous materials. The plastic foam moldings are useful as patterns in an evaporative casting process, wherein the molding is vaporized and replaced by molten metal.

8 Claims, 1 Drawing Sheet

METHOD OF CONTROLLING THE PYROLYSIS RATE OF A PLASTIC FOAM

CROSS REFERENCE TO RELATED APPLICATIONS

This application is a continuation-in-part application of copending application Ser. No. 07/233,081, filed Aug. 17, 1988, now abandoned and entitled Pre-Expanded Plastic Beads For Controlling Thermal Shrinkage and Pyrolytic Rate of Plastic Foam.

FIELD OF THE INVENTION

This invention pertains to methods of controlling the pyrolysis rate and resistance to thermal shrinkage of plastic foam moldings. Such moldings are useful in the preparation of metal castings by evaporative pattern casting.

BACKGROUND OF THE INVENTION

It is well-known that metal castings having complex or intricate shapes may be obtained using plastic foam moldings, embedded in a support material such as sand, which vaporize upon contact with the molten metal. The molten metal replaces the vaporized plastic foam, thus creating a metal replica of the molding in the support medium.

However, the plastic foam moldings are typically prepared using thermoplastic polymers having relatively low melting or softening points. For example, polystyrene has an ignition point of 380° C. but a softening point of only about 100° C. At a temperature of about 100° C., a polystyrene foam molding begins to shrink and crumble. This lack of heat resistance can adversely affect the quality of the metal casting obtained therefrom. The problem is aggravated by the relatively high ambient temperatures present in an industrial foundry setting.

Additionally, the rate of pyrolysis of a plastic foam molding is generally not readily controllable. Due to this lack of control, defects in the metal castings resulting from the escaping gas generated by the vaporized foam cannot be easily eliminated. It is thus apparent there is a great need for a method whereby the heat resistance and pyrolysis rate of a plastic foam molding can be adjusted as desired in response to the particular requirements of an evaporative pattern casting process.

SUMMARY OF THE INVENTION

This invention provides a method for controlling the pyrolysis rate and thermal shrinkage of a plastic foam molding. The method comprises forming the plastic foam molding from expandable plastic beads coated with from about 0.01 to 2.0 weight percent of a substantially water-insoluble inorganic siliceous material. The siliceous material is selected from the group consisting of silicates and polysilicates of sodium, potassium, magnesium, calcium, and aluminum.

Also provided by this invention is a process for producing a solid metal casting which comprises embedding a plastic foam molding in a support material, contacting the plastic foam molding with molten metal, and cooling the molten metal below the melting temperature of the metal. The plastic foam molding, which is formed from expandable plastic beads coated with from 0.01 to 2.0 weight percent of a substantially water-insoluble inorganic siliceous material, is vaporized by the molten metal. The metal fills the space occupied by the plastic foam molding, thus creating a metal replica of the molding. The rate of pyrolysis and the heat resistance of the plastic foam molding are controlled as desired by varying the amount of siliceous material coated on the beads.

DETAILED DESCRIPTION OF THE INVENTION

Figure 1:
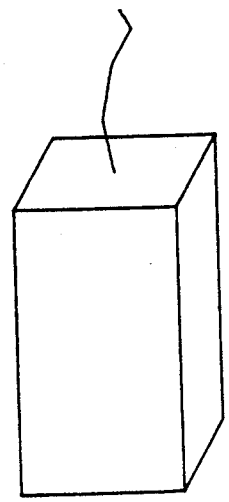
FIG. 1 shows a test specimen used to measure thermal shrinkage of the plastic foam moldings of this invention.

Beads of any suitable thermoplastic polymer may be used in the process of this invention. Preferably, the thermoplastic polymer has a softening point between about 35° C. and 200° C. and an ignition temperature at least about 100° C. less than the temperature of the molten metal to be used to prepare the metal casting.

Suitable thermoplastic polymers include polymers and copolymers of ethylenically unsaturated monomers such as α-olefins (ethylene, propylene, 1-butene, and the like), vinyl aromatic monomers (styrene, α-methyl styrene, p-methyl styrene, and the like), and alkyl esters of unsaturated carboxylic acids (especially $C_1$–$C_4$ alkyl esters of acrylic acid and methacrylic acid). Copolymers of epoxides and carbon dioxide (aliphatic polycarbonates) and copolymers of vinyl aromatic monomers and α,β-unsaturated dicarboxylic acid derivatives (styrene/maleic anhydride, for example) may also be used. The thermoplastic polymer may be a homopolymer or a random or block copolymer and may have a linear, branched, or cross-linked structure.

Illustrative preferred polymers include, but are not limited to, polystyrene, styrene/methyl methacrylate copolymer, polypropylene, polymethyl methacrylate, polyphenylene oxide, polyethylene, ethylene/propylene copolymer, polypropylene carbonate, ethylene/propylene/styrene interpolymer, and mixtures, blends, and alloys thereof. Methods for obtaining such polymers in bead or particulate form are well-known in the art. It is preferred that the beads be substantially spherical in shape and have an average diameter of from about 0.05 to 10 mm.

The plastic beads are impregnated with a blowing agent capable of expanding the beads. Although any suitable blowing agent may be employed, the use of $C_4$–$C_7$ linear, branched, and cyclic aliphatic hydrocarbons and $C_1$–$C_3$ halogenated hydrocarbons is preferred. Illustrative preferred blowing agents include butane, isobutane, pentane, cyclopentane, hexane, cyclohexane, methylene chloride, and chlorofluorocarbons such as trichlorofluoromethane, dichlorodifluoromethane, chlorotrifluoromethane, dichlorofluoromethane, chlorofluoromethane, 1,1,2-trichloro-1,2,2-trifluoroethane, chloropentafluoroethane, and the like and mixtures thereof. The blowing agent is preferably used in an amount of from about 1 to 15 percent by weight of the plastic beads. Impregnation may be accomplished by any known means such as, for example, suspending the beads in a mixture of blowing agent and water, heating to accomplish absorption of the blowing agent by the beads, and separating the impregnated beads from the water.

In a preferred embodiment of this invention, the impregnated beads are simultaneously pre-expanded and coated with the inorganic siliceous material. The pre-expansion may be performed before the coating step. Alternatively, the plastic beads may be first coated with the siliceous material and then impregnated and pre-expanded as described in U.S. Pat. No. 3,304,274 (the teachings of this patent are incorporated herein by reference). During the pre-expansion step, the impregnated beads are heated at a time and pressure sufficient to increase the bead volume. The bead volume will typically be increased from about 5 to 50 times the original volume. The pre-expansion is preferably carried out in a manner such that the beads do not fuse together or agglomerate. Any appropriate apparatus or method may be used for the pre-expansion. For example, the pre-expansion system may be of the type in which steam vapor is used to directly heat the impregnated beads. Alternatively, an indirect heating system having a steam jacket or equivalent may be employed. The pre-expansion is preferably carried out at a reduced pressure.

The inorganic siliceous material is selected from the group consisting of substantially water-insoluble silicates and polysilicates of sodium, potassium, magnesium, calcium, and aluminum. Illustrative siliceous materials suitable for use include magnesium metasilicate (clinoenstatite), magnesium orthosilicate (forsterite), aluminum silicate (sillimanite, andalusite, cyanite, or mullite), calcium metasilicate (pseudo wollastonite or wollastonite), calcium di-orthosilicate, calcium trisilicate (alite), calcium alumino silicate (anorthite), calcium magnesium metasilicate (diopside), calcium aluminum orthosilicate (mervinite), sodium aluminum orthosilicate (nephelite), sodium alumina trisilicate (albite), sodium aluminum metasilicate (jadeite), potassium aluminosilicate (orthoclase, microcline, muscovite), potassium aluminum metasilicate (leucite), potassium aluminum orthosilicate (kaliophilite), and the like and mixtures thereof.

The levels of sodium or potassium should not be so high as to render the siliceous material appreciably water-soluble. The siliceous material may contain minor amounts of other inorganic components such as amorphous silica or sodium silicate. The amount of siliceous material employed is from about 0.01 to 2.0 percent by weight of the impregnated plastic beads, although the range of from about 0.05 to 1.0 weight percent is generally most suitable. One of the key advantages of this invention is the ability to readily control the pyrolysis rate and heat resistance of the foamed plastic molding by varying the level of siliceous material present on the beads. Concentrations greater than about 2 weight percent can cause problems during molding due to incomplete fusion of the beads. The siliceous material is preferably employed as a finely divided powder (less than about 200 microns). When the coating process is completed, the siliceous material generally is present as a relatively uniform thin coating on the surface of the beads.

In a preferred embodiment of this invention, the pre-expansion and coating steps are accomplished in a single step by heating a mixture of the impregnated beads and the siliceous material in a pre-expansion vessel. The siliceous material may be present as either a dry powder or as a slurry in water or other appropriate liquid medium. It is preferred to quench the pre-expanded coated beads immediately after pre-expansion in order to obtain a more uniform density. Using a double steam-jacketed pre-expansion vessel under reduced pressure, for example, a small amount of water can be introduced to immediately remove the latent heat and to quickly cool the beads. This technique also tends to result in more uniform coating of the beads.

The coated pre-expanded beads can be shaped into the desired plastic foam molding by directly foaming the beads in a suitably shaped mold or by cutting a previously foamed block into the desired shape. Alternatively, the beads may be expanded and foamed in a pre-formed mold or space within a support medium. In the direct foaming method, the coated pre-expanded plastic beads are heated in a mold (preferably, one that is vented) at a temperature and pressure sufficient to cause further expansion and fusion of the beads. The appropriate conditions will vary depending upon the particular thermoplastic polymer and blowing agent used. The density of the plastic foam molding is dependent on temperature, time, and pressure, among other factors, and will vary in accordance with the target application but will most preferably be from about 0.010 to 0.050 g/cc. The heat resistance (i.e., resistance to thermal shrinkage) and rate of pyrolysis can be readily controlled by changing the foam density and the amount of the siliceous material coated on the beads.

To prepare a metal casting, the plastic foam molding is first embedded in a suitable support material. The support material is most preferably silica sand or a foundry sand. A molten metal, which may be any appropriate metal such as aluminum alloy, steel, iron, iron alloy, or the like, is then poured onto the plastic foam molding, causing it to vaporize. The molten metal thus replaces the vaporized molding. Vents can be introduced in the support medium to assist in the removal of the gaseous decomposition products. When the molten metal is cooled and solidified, the metal casting produced may then be separated from the support medium. The metal castings produced by the process of this invention are of high quality and generally require little, of any, further finishing to be suitable for use.

From the foregoing description, one skilled in the art can readily ascertain the essential characteristics of this invention, and, without departing from the spirit and scope thereof, can make various changes and modifications of the invention to adapt it to various usages, conditions, and embodiments.

The following examples further illustrate this invention, but are not limitative of the invention in any manner whatsoever.

EXAMPLE 1

Using an indirect heating type system having a reduced pressure double container construction (manufactured by the Kohler General Co.), expandable polystyrene particles mixed with from 0.0 to 0.20 weight percent of a substantially water-insoluble calcium/aluminum silicate containing minor amounts of amorphous silica and sodium silicate were pre-expanded to a density of about 0.017 g/cc in an aluminum alloy container provided with stirring vanes (Table 1).

TABLE 1

| Sample | Density g/cc | Silicate/Polysilicate Content, Dry Wt % |
|---|---|---|
| A | 0.0168 | 0.00 |
| B | 0.0169 | 0.05 |
| C | 0.0169 | 0.10 |

TABLE 1-continued

| Sample | Density g/cc | Silicate/Polysilicate Content, Dry Wt % |
|---|---|---|
| D | 0.0170 | 0.15 |
| E | 0.0170 | 0.20 |

Because of differences between the outside and inside density of the beads immediately after pre-expansion, the pre-expanded beads were aged about 3 hours before molding into 430 × 430 × 50 mm boards in a polystyrene foam molding machine. The boards were aged for one week to allow natural shrinkage to occur, after which 30 × 50 × 100 mm blocks as shown in FIG. 1 were prepared for measurement of heat shrinkage. The test pieces were held for 90 seconds in a hot air tank controllable so far as possible to temperatures of approximately 100° C., 130° C., and 160° C. The amount of volume shrinkage was then measured; the results are shown in Table 2.

TABLE 2

| Sample | Silicate/Polysilicate Content, dry wt % | % Volume Shrinkage Heated for 90 Sec. | | |
|---|---|---|---|---|
| | | 100–102° C. | 128–130° C. | 158–161° C. |
| A | 0.00 | 3.90 | 9.81 | 81.86 |
| B | 0.05 | 1.78 | 3.22 | 74.81 |
| C | 0.10 | 0.66 | 2.81 | 66.26 |
| D | 0.15 | 0.21 | 2.77 | 55.91 |
| E | 0.20 | 0.20 | 2.46 | 43.84 |

The incorporation of the siliceous material clearly improved the thermal shrinkage resistance of the polystyrene foam moldings. By adjusting the foaming process so that the foam density was about 0.030 g/cc and by increasing the silicate content to about 0.50 percent, foam moldings exhibiting no thermal shrinkage at 100° C. were obtained.

EXAMPLE 2

Figure 2:
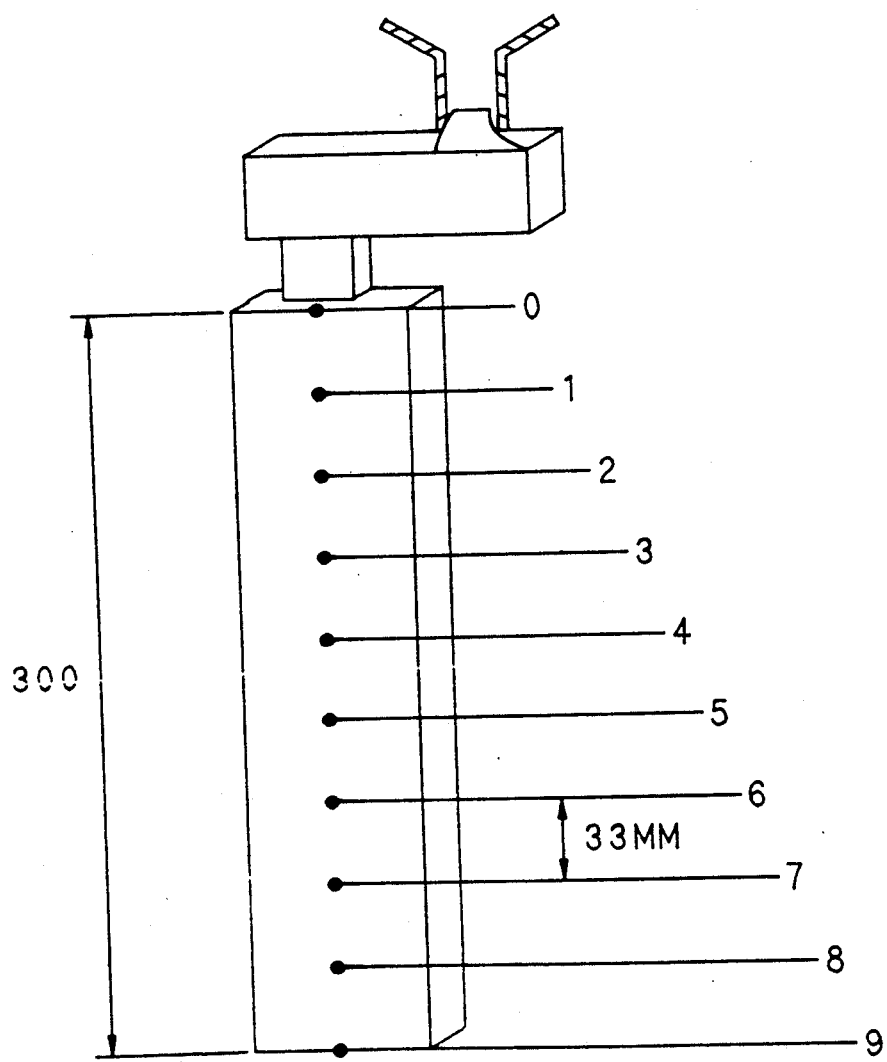
FIG. 2 illustrates the test apparatus used to measure the thermal decomposition rate of the plastic foam moldings.

Extinction test pieces measuring 30 × 50 × 300 mm were similarly prepared from the polystyrene foam board described in Example 1. The pieces were buried in dry silica sand (AFS No. 25–55), which was vibrated (1500–7500 cycles) and packed in a filling time of less than 3 minutes. Molten aluminum alloy at 700° C. was then poured onto one end of each test piece. The extinction time was measured at 33 mm intervals from the initial measuring point as shown in FIG. 2 by means of an electronic micro process sequence measuring unit. The results are shown in Table 3.

TABLE 3

| Sample | 1 | 2 | 3 | 4 | 5 | 6 | 7 | 8 | 9 | Total |
|---|---|---|---|---|---|---|---|---|---|---|
| A | 0.40 | 0.76 | 1.20 | 1.56 | 1.98 | 2.38 | 2.66 | 3.02 | 3.40 | 17.36 |
| B | 0.44 | 0.88 | 1.28 | 1.70 | 2.16 | 2.53 | 2.92 | 3.26 | 3.72 | 18.89 |
| C | 0.60 | 1.02 | 1.46 | 1.88 | 2.30 | 2.82 | 3.26 | 3.72 | 4.10 | 21.16 |
| D | 0.64 | 1.08 | 1.64 | 2.12 | 2.66 | 3.12 | 3.64 | 4.05 | 4.50 | 23.45 |
| E | 0.66 | 1.20 | 1.72 | 2.18 | 2.68 | 3.26 | 3.90 | 4.32 | 4.90 | 24.82 |

Rate of extinction substitution (second), JIS aluminum alloy AC-48, pour temperature 700° C., sample size 30 × 50 × 300 mm sprue system (FIG. 2 as shown).

The polystyrene foam was decomposed and vaporized by the advancing aluminum alloy. Increasing levels of the siliceous material clearly delayed the time for replacement by the molten alloy and decreased the gas pressure formed during melt substitution. The gas generated was easily dispersed into the silica sand support medium. Cooling of the metal was accelerated by the endothermic pyrolysis.

EXAMPLE 3

Following the same testing procedure described in Example 2, extinction times were measured using a cast iron melt at approximately 1350° C. (Ce=4.29, C=3.66, Si=1.85).

The results of these measurements are given in Table 4. Because of the ability to control the rate of pyrolysis by increasing the level of siliceous material present in the foam moldings, the pressure of the generated gas can be minimized. The gas is thus adequately dispersed, resulting in fewer gas defects and satisfactory substitution by the molten cast iron.

TABLE 4

| Sample | 1 | 2 | 3 | 4 | 5 | 6 | 7 | 8 | 9 | Total |
|---|---|---|---|---|---|---|---|---|---|---|
| A | 0.32 | 0.32 | 0.38 | 0.52 | 0.54 | 0.72 | 0.76 | 0.78 | 0.88 | 5.22 |
| B | 0.24 | 0.38 | 0.48 | 0.56 | 0.64 | 0.76 | 0.86 | 0.94 | 0.98 | 5.84 |
| C | 0.20 | 0.38 | 0.52 | 0.54 | 0.64 | 0.80 | 0.86 | 0.94 | 1.18 | 6.06 |
| D | 0.30 | 0.50 | 0.60 | 0.72 | 0.88 | 1.10 | 1.16 | 1.26 | 1.28 | 7.80 |
| E | 0.30 | 0.36 | 0.58 | 0.56 | 0.69 | 0.85 | 0.96 | 1.06 | 1.24 | 6.60 |

Rate of extinction substitution (sec.), FC-20 casting (Ce = 4.29, C = 3.66, Si = 1.85), sample size 30 × 50 × 300 mm, sprue system (FIG. 2 as shown).

EXAMPLE 4

Expandable polypropylene beads were coated with 0.0–0.20 weight percent water-insoluble silicate as described in Example 1 and formed into plastic moldings. The thermal shrinkage and pyrolysis rate of the polypropylene foam moldings were successfully controlled in the same manner as the polystyrene foam moldings of Examples 2 and 3.

EXAMPLE 5

Similar results were also obtained using expandable polymethyl methacrylate beads impregnated with a fluorocarbon.

EXAMPLE 6

Beads of an ethylene/propylene/styrene interpolymer impregnated with isopentane blowing agent (prepared in accordance with Example 1 of U.S. Pat. No. 4,622,347) are mixed with 0.0–2.0 weight percent finely divided aluminum silicate, pre-expanded, and then foamed into plastic foam moldings as described in Example 1. Test pieces are prepared and tested as described previously using a molten aluminum alloy (Alum. Assoc. No. 208.0; 3.0% Si; 4.0% Cu). Thermal shrinkage and the rate of pyrolysis are decreased by increasing the amount of siliceous material coated on the polypropylene beads.

EXAMPLE 7

Similar results are also obtained using ethylene/propylene random copolymer beads coated with varying amounts (0.0-2.0 weight percent) of finely divided magnesium orthosilicate (forsterite) and impregnated with dichlorodifluoromethane. The impregnated plastic beads are prepared in accordance with Example 1 of U.S. Pat. No. 4,379,859, the teachings of which are incorporated herein by reference.

I claim:

1. A method which comprises:

pyrolyzing a plastic foam molding made from expandable plastic beads coated with from about 0.10 to 2.0 weight percent of a substantially water-insoluble inorganic siliceous material selected from the group consisting of silicates and polysilicates of sodium, potassium, magnesium, calcium, and aluminum;

wherein the pyrolysis rate and the rate of thermal shrinkage of the plastic foam molding are controlled as desired by varying the amount of siliceous material coated on the beads.

2. The method of claim 1 wherein the expandable plastic beads are beads of a thermoplastic polymer selected from the group consisting of polystyrene, styrene/methyl methacrylate copolymer, polypropylene, polymethyl methacrylate, polyphenylene oxide, polyethylene, polypropylene carbonate, and mixtures thereof.

3. The method of claim 1 wherein the expandable plastic beads are coated with from about 0.05 to 1.0 weight percent of the substantially water-insoluble inorganic siliceous material.

4. The method of claim 1 wherein the expandable plastic beads are impregnated with a volatile hydrocarbon selected from the group consisting of $C_4$-$C_7$ linear, branched, and cyclic aliphatic hydrocarbons, $C_1$-$C_3$ halogenated hydrocarbons, and mixtures thereof.

5. The method of claim 1 wherein the plastic foam molding is formed by heating the coated expandable plastic beads in a mold at a temperature and pressure effective to accomplish expansion and fusion of the plastic beads.

6. A method which comprises:

pyrolyzing a plastic foam molding suitable for use in evaporative pattern casting and made by the steps of:

(a) impregnating plastic beads with a volatile blowing agent to obtain impregnated plastic beads;

(b) combining the impregnated plastic beads with from about 0.01 to 2.0 weight percent of a substantially water-insoluble inorganic siliceous material selected from the group consisting of silicates and polysilicates of sodium, potassium, magnesium, calcium, and aluminum to form a mixture;

(c) heating the mixture at a temperature and pressure effective to form pre-expanded plastic beads coated with the siliceous material; and (d) heating the coated pre-expanded plastic beads in a mold at a temperature and pressure effective to accomplish expansion and fusion of the beads and to form the plastic foam molding;

wherein the pyrolysis rate and the rate of thermal shrinkage of the plastic foam molding are controlled as desired by varying the amount of siliceous material coated on the beads.

7. The method of claim 6 wherein the plastic beads are beads of a thermoplastic polymer selected from the group consisting of polystyrene, styrene/methyl methacrylate copolymer, polypropylene, polymethyl methacrylate, polyphenylene oxide, polyethylene, ethylene/propylene copolymer, polypropylene carbonate, ethylene/propylene/styrene interpolymer, and mixtures thereof.

8. The method of claim 6 wherein the blowing agent is selected from the group consisting of $C_4$-$C_6$ linear, branched, and cyclic aliphatic hydrocarbons, $C_1$-$C_3$ halogenated hydrocarbons, and mixtures thereof.

* * * * *